United States Patent [19]

Self

[11] 4,192,791

[45] Mar. 11, 1980

[54] HIGHLY EXTENDED, UNSATURATED POLYESTER RESIN SYRUP COMPOSITION MIXTURE CONTAINING BASIC ALUMINUM CHLORIDE, A SHAPED ARTICLE COMPRISED OF THE CURED, CROSS-LINKED COMPOSITION AND A PROCESS OF PREPARING SUCH ARTICLE

[75] Inventor: James M. Self, Taylor, S.C.

[73] Assignee: Tanner Chemical Company, Inc., Greenville, S.C.

[21] Appl. No.: 911,758

[22] Filed: Jun. 2, 1978

[51] Int. Cl.$^2$ ............................. C08K 3/22; C08K 3/40
[52] U.S. Cl. .......................... 260/40 R; 260/29.2 UA; 260/45.7 R; 525/249
[58] Field of Search ........ 260/40 R, 29.2 UA, 45.7 R, 260/865

[56] References Cited

U.S. PATENT DOCUMENTS

| | | | |
|---|---|---|---|
| 2,844,551 | 7/1958 | Orthner et al. | 260/45.7 R |
| 3,256,223 | 6/1966 | Heijmer | 260/29.2 UA |
| 3,361,845 | 1/1968 | Watanabe et al. | 260/865 X |
| 3,437,619 | 4/1969 | Nutt | 260/29.2 UA |
| 3,536,642 | 10/1970 | Williger | 260/29.2 UA |
| 3,894,984 | 7/1975 | Demmler | 260/865 X |

*Primary Examiner*—Sandra M. Person
*Attorney, Agent, or Firm*—Burns, Doane, Swecker & Mathis

[57] ABSTRACT

A highly extended, unsaturated polyester resin syrup composition mixture comprising unsaturated polyester resin syrup, basic aluminum chloride and non-reinforcing extender material which is substantially non-reactive with the resin syrup and the basic aluminum chloride. The composition mixture may be used to prepare a shaped article comprised of the cured, cross-linked composition. The article is prepared by first forming a first component comprising unsaturated polyester resin syrup and non-reinforcing extender material and a second component comprising a solution of basic aluminum chloride and non-reinforcing extender material. The two components are mixed together to yield the composition mixture which possesses a viscosity low enough to be worked with conventional apparatus. The composition mixture is then shaped into the configuration of the desired article, allowed to cure and, if necessary, allowed to set. The extender material may be selected such that the resulting composition exhibits excellent structural strength and fire properties.

30 Claims, No Drawings

HIGHLY EXTENDED, UNSATURATED POLYESTER RESIN SYRUP COMPOSITION MIXTURE CONTAINING BASIC ALUMINUM CHLORIDE, A SHAPED ARTICLE COMPRISED OF THE CURED, CROSS-LINKED COMPOSITION AND A PROCESS OF PREPARING SUCH ARTICLE

BACKGROUND OF THE INVENTION

1. Field of the Invention

This invention relates to a highly extended, unsaturated polyester resin syrup composition mixture containing basic aluminum chloride. This invention also relates to a shaped article comprised of the cured, cross-linked, highly extended, basic aluminum chloride containing, unsaturated polyester resin syrup composition and to a process of preparing the shaped article.

2. Description of the Prior Art

It is known in the art that a wide variety of extenders may be incorporated into an unsaturated polyester resin syrup composition. The particular extender material selected is dependent upon a number of considerations including strength, flamability, texture, cost, etc. For example, U.S. Pat. No. 3,591,191 describes a water-in-resin syrup emulsion which is utilized in the preparation of a thermoset annular sealing ring for a pipe connection.

A further example of an extended unsaturated polyester resin syrup composition is disclosed in applicant's U.S. Pat. No. 3,978,018 wherein aqueous alkali stabilized colloidal silica and, optionally, other reinforcing and non-reinforcing extender materials are added to the resin syrup to obtain a composition which possesses a low fuel content and a low flame spread.

In applicant's U.S. Pat. Nos. 4,011,195 and 4,013,614 a composition which also possesses a low fuel content and a low flame spread is obtained by adding aqueous alkali metal silicate and, optionally, other reinforcing and non-reinforcing extender materials to an unsaturated polyester resin syrup.

Yet another example of an extended, fire-retardant unsaturated polyester resin syrup composition is disclosed in U.S. Pat. No. 4,041,008. The composition is comprised of an unsaturated aliphatic polyester resin, an aliphatic vinyl cross-linking monomer and from about 50 to 75 percent by weight hydrated alumina. Glass fibers may also be incorporated into the composition.

It has now been discovered that when an unsaturated polyester resin syrup composition is highly extended (i.e., above about 2.0:1.0, extender material to resin syrup), the viscosity of the freshly mixed components (i.e., the composition mixture) rapidly increases to the point where it can no longer be worked with conventional apparatus. The lower extended compositions possess the inherently dangerous drawback of having a relatively high fuel content due to the presence of a substantial proportion of resin syrup. This makes articles prepared from such lower extended compositions subject to burning and thermal degradation.

OBJECTS AND SUMMARY OF THE INVENTION

It is therefore an object of the present invention to provide an unsaturated polyester resin syrup composition which eliminates or substantially reduces the problems of the prior art.

It is a more specific object of the present invention to provide a highly extended, unsaturated polyester resin syrup composition mixture containing basic aluminum chloride.

It is another object of the present invention to provide a cured, cross-linked, highly extended, unsaturated polyester resin syrup composition containing basic aluminum chloride which possesses excellent fire properties.

It is yet another object of the present invention to provide a highly extended, unsaturated polyester resin syrup composition mixture containing basic aluminum chloride which does not shrink upon curing.

It is a further object of the present invention to provide a shaped article comprised of a cured, cross-linked, highly extended, unsaturated polyester resin syrup composition containing basic aluminum chloride.

It is a still further object of the present invention to provide a process for preparing a shaped article comprised of a cured, cross-linked, highly extended, unsaturated polyester resin syrup composition containing basic aluminum chloride wherein the composition mixture possesses a viscosity low enough to be handled with conventional apparatus.

These and other objects, as well as the scope, nature, and utilization of the invention will be apparent from the following summary and description of the preferred embodiments of the present invention.

In one aspect, the present invention relates to a highly extended, unsaturated polyester resin syrup composition mixture comprising:
(a) unsaturated polyester resin syrup;
(b) basic aluminum chloride; and
(c) non-reinforcing extender material,
wherein the dry weight ratio of the sum of the extender material and the basic aluminum chloride to the resin syrup is from about 2.0:1.0 to about 8.5:1.0 and wherein the dry weight ratio of extender material to basic aluminum chloride is less than about 7.5:1.0.

In a second aspect, the present invention relates to a highly extended, unsaturated polyester resin syrup composition mixture comprising:
(a) from about 12 to about 30%, by weight, of unsaturated polyester resin syrup;
(b) from about 5 to about 30%, by dry weight, of basic aluminum chloride; and
(c) from about 50 to about 80%, by weight, of non-reinforcing extender material.

In another aspect, the present invention relates to a shaped article comprised of a cured, cross-linked highly extended, unsaturated polyester resin syrup composition comprising:
(a) unsaturated polyester resin syrup;
(b) basic aluminum chloride; and
(c) non-reinforcing extender material
wherein the dry weight ratio of the sum of extender material and the basic aluminum chloride to the resin syrup is from about 2.0:1. to about 8.5:1.0 and wherein the dry weight ratio of the extender material to the basic aluminum chloride is less than about 7.5:1.0.

In a further aspect, the present invention relates to a process for preparing a shaped article comprising:
(a) preparing a first component comprising
 (i) unsaturated polyester resin syrup, and
 (ii) non-reinforcing extender material;
(b) preparing a second component comprising
 (i) an aqueous solution containing from about 40 to about 65%, by weight, of basic aluminum chloride, on a calculated basis, and (ii) non-reinforcing extender material;
(c) mixing the first and second components;
(d) shaping the mixture into the configuration of the article; and
(e) curing the mixture,
wherein the dry weight ratio of the sum of the extender materials and the basic aluminum chloride to the resin syrup is from about 2.0:1.0 to about 8.5:1.0 and the dry weight ratio of the extender materials to the basic aluminum chloride is less than about 7.5:1.0.

DESCRIPTION OF PREFERRED EMBODIMENTS

As stated above, one aspect of the present invention relates to a cured, cross-linked, highly extended, unsaturated polyester resin syrup composition containing basic aluminum chloride. The composition, in its uncured state, may be employed wherever polyester resins are utilized. These utilities include the preparation of shaped articles such as coatings, furniture, toys, plumbing fixtures, duct work, automotive body parts, boats, electrical component housings, electrical circuit boards, decorative items, appointments and a variety of other products. One preferred utility is in the preparation of construction materials such as shaped building panels, fire walls or fire doors which exhibit excellent strength and fire properties. As used in the present specification, the term "shaped" describes an article which may be prepared by techniques which are generally utilized in this art. Thus, for example, this term encompasses articles which are prepared by spraying, molding, pressing, casting, hand lay-up, extruding, rolling, etc.

The highly extended composition is comprised of unsaturated polyester resin syrup, basic aluminum chloride and extender material. The amounts of the three components are selected such that the dry weight ratio of the sum of the extender material and the basic aluminum chloride to the unsaturated polyester resin syrup is from about 2.0:1.0 to about 8.5:1.0, preferably from about 2.5:1.0 to about 6.5:1.0, and the dry weight ratio of the extender material to the basic aluminum chloride is less than about 7.5:1.0, preferably from about 4.0:1.0 to about 7.0:1.0. As used in the present specification, the terms "dry weight ratio" and "dry weight" are used to define the weight of solid basic aluminum chloride present in the composition on a calculated basis as discussed below. That is, the water content of the basic aluminum chloride (which is generally employed in solution form) is not included in the determination of the amount of basic aluminum chloride present in the composition.

A typical composition of the present invention is comprised of from about 12 to about 30%, by weight, of unsaturated polyester resin syrup, from about 5 to about 30%, by dry weight, of basic aluminum chloride and from about 50 to about 80%, by weight, of extender material. The percentages of the composition in its cured or uncured (i.e., composition mixture) form all refer to the total of the weight of the resin group, the dry weight of the basic aluminum chloride and the weight of the extender material.

A preferred composition of the present invention is comprised of from about 15 to about 25%, by weight, of unsaturated polyester resin syrup, from about 8 to about 15%, by dry weight, of basic aluminum chloride and from about 60 to about 70%, by weight, of extender material.

The unsaturated polyester resin syrup which is used in the composition of the present invention is prepared by combining an unsaturated polyester resin with a copolymerizable monomer which contains a terminal vinyl group. The unsaturated polyester resin is generally derived from the polyesterification of a polycarboxylic acid or a polycarboxylic acid anhydride with a polyol, customarily a glycol, in a manner known to those of ordinary skill in the art. To obtain ethylenic unsaturation, the polycarboxylic acid (or acid anhydride), the polyol, or both, must contain at least one ethylenically unsaturated double bond in the structure.

Typical of the polycarboxylic acids and acid anhydrides which may be used in the present invention are phthalic acid or anhydride, adipic acid or anhydride, succinic acid or anhydride, tetrahydrophthalic acid or anhydride, tetrabromophthalic acid or anhydride, maleic acid or anhydride, fumaric acid or anhydride, and combinations thereof.

Typical polyols which are used in the preparation of the unsaturated polyester resin are ethylene glycol, propylene glycol, butylene glycol, neopentyl glycol, diethylene glycol, dipropylene glycol, polyethylene glycol, polypropylene glycol, trimethylol ethane, trimethylol propane, pentaerythritol and combinations thereof. As is well known to those skilled in the art, a slight stoichiometric excess of polyol is generally employed in the preparation of the unsaturated polyester resin to facilitate the reaction between the polycarboxylic acid (or anhydride) and the polyol and to reduce the viscosity of the formed polyester resin.

As stated above, the copolymerizable monomer, which is combined with the unsaturated polyester resin to form the liquid resin syrup, contains a terminal vinyl group. When reacted with the unsaturated polyester resin, the copolymerizable monomer results in a polymer structure which is cross-linked. Exemplary of such monomers are styrene, alpha-methyl styrene, o-chlorostyrene, vinyl toluene, acrylic acid, methacrylic acid, alkyl acrylates, alkyl methacrylates, divinyl benzene, diacrylates, dimethacrylates, triacrylates, trimethacrylates and combinations thereof. In general, the monomer is provided in an amount which constitutes from about 20 to about 40% of the total weight of the resin syrup.

A further type of acceptable copolymerizable monomer is the reaction product of a polyepoxide with acrylic or methacrylic acid, as described in U.S. Pat. Nos. 3,373,075 and 3,301,743, the contents of which are incorporated by reference in the interest of brevity. Similar monomers may be prepared by reacting a polyol such as 2,2-bis (4-hydroxyphenol) propane i.e., bisphenol A, with glycidyl acrylate or glycidyl methacrylate. This type of copolymerizable monomer may be employed as a partial replacement for other copolymerizable monomers and/or as a partial replacement for a portion of the unsaturated polyester resin in the preparation of the resin syrup.

Further examples of acceptable polycarboxylic acids or anhydrides, polyols and copolymerizable monomers are set forth in U.S. Pat. No. 4,041,008, the content of which is incorporated by reference in the interest of brevity.

To reduce the viscosity of the composition mixture and thus enable higher extensions to be obtained, the composition must contain basic aluminum chloride. As used in the present specification, the term "basic aluminum chloride", otherwise known as aluminum chlorohydrate, which is employed in the unsaturated polyester resin syrup composition of the present invention, defines a compound having the general formula:

$$Al_2(OH)_xCl_{6-x}$$

wherein x is 3, 4 or 5.

It has been found that where x is 0, 1 or 2, the resulting compound cannot be employed to obtain the formation of a homogenous mixture of the resin syrup, basic aluminum chloride and extender material. It is thought that this is due to the highly acidic nature of the compound. On the other hand, if x is 6, aluminum hydroxide results, which does not possess the ability of the defined basic aluminum chloride of being able to form the highly extended unsaturated polyester resin syrup composition of the present invention.

The basic aluminum chloride may be incorporated in the composition in solid form. However, to obtain workable mixtures which have extensions of more than about 250%, it is necessary to use the basic aluminum chloride as a solution. Although the precise reason for requiring a solution for high extensions is not fully understood, it is believed that the liquid serves to wet the extender material particles thereby reducing viscosity. Applicant, however, does not intend to be bound by this theory.

In general, the solution is an aqueous mixture containing from about 40 to about 65%, by weight, of solid basic aluminum chloride. Since the basic aluminum chloride solution is not formed by merely adding water to the anhydrous compound but rather by reacting all the necessary components, the indicated percentages of water present in the solution are determined on a stoichiometrically calculated basis. That is, the percentage of water in the final solution is determined by calculating the amount of water used in the reaction mixture with respect to the other reactants. One particularly acceptable aqueous solution contains about 50%, by weight, of $Al_2(OH)_5Cl \cdot y\ H_2O$ and is available from Wickhen Products, Inc. of Huguenot, N.Y., under the trademark Wickenol 308. While solutions containing basic aluminum chloride in amounts outside the above range may be employed in the present invention, it has been found that such solutions possess certain disadvantages. In particular, with solutions containing less than about 40%, by weight, of solid basic aluminum chloride, the composition mixture exhibits a marked tendency of shrinking and warping upon curing. With solutions containing more than about 65%, by weight, of solid basic aluminum chloride, the composition mixture generally becomes too viscous to handle with conventional apparatus and is, in fact, almost in solid form.

The extender material, which forms the third component of the composition of the present invention, is generally non-reinforcing in nature in that it typically does not greatly contribute to the overall strength of the composition. The extender material is also substantially non-reactive with the unsaturated polyester resin syrup and the basic aluminum chloride. That is, the extender material does not interfere with the curing or cross-linking reactions and does not interact with the basic aluminum chloride so as to prevent the formation of the cured, cross-linked, highly extended, unsaturated polyester resin syrup composition of the present invention.

The non-reinforcing, substantially non-reactive extender material is generally particulate in form. For example, the extender material may be refractory aggregates, ground glass, glass microspheres, silica, magnesium oxide, mullite, fly ash, zirconia, clays, bentonite, kaolin, attipulgite, titanium dioxide, antimony oxide, pigments, low density insulating materials such as perlite or expanded vermiculate, and combinations thereof. The particular extender material employed is generally dependent on the desired properties of the composition. For example, one preferred extender material is aluminum trihydrate (Al (OH)$_3$) which imparts excellent fire properties to the composition. One type of acceptable aluminum trihydrate is available from Solem Industries, Inc., of Atlanta, Ga. under the name SB-332.

Plaster of Paris, which does contribute to the strength of the composition, is considered another preferred extender material. The plaster of Paris is initially incorporated into the composition mixture as calcium sulfate hemihydrate (CaSO$_4$ . ½H$_2$O). One important advantage of using plaster of Paris is that it absorbs water as it is hydrated to calcium sulfate dihydrate (Ca SO$_4$ . 2H$_2$O). The expansion of the plaster of Paris as it hydrates helps to prevent the composition mixture from shrinking as it cures. This aspect of the present invention will be more fully described below. An especially preferred extender material is a combination of aluminum trihydrate and plaster of Paris which yields a composition mixture which does not shrink upon curing and which has excellent fire properties.

In preparing an unsaturated polyester resin syrup composition which has a higher degree of extension (e.g., from about 5.5:1.0 to about 8.5:1.0, extender material and dry basic aluminum chloride to resin syrup), the particle size distribution of the non-reactive extender material is generally selected so as to reduce the viscosity of the composition mixture. In particular, by employing a certain distribution of particle sizes, larger amounts of extender material may be added to the composition mixture, without increasing the viscosity beyond the capabilities of conventional handling apparatus. Of course, the distribution of particles sizes may also be used to reduce the viscosity of composition mixtures having extensions of less than about 5.5:1.0. An additional advantage of the lower viscosity is that it will enable various additives to be readily incorporated into the formed composition mixture.

While the precise reasons for this phenomenon are not completely understood, it is believed that the smaller particles will fit into the interstices formed by the larger particles thereby enabling higher extensions to be obtained. The continuous liquid phase serves to maintain the viscosity of the mixture within workable limits. It is to be understood however, that applicant does not intend to be bound by this theory.

The specific particle size distribution of the extender material required to obtain a composition mixture possessing a reduced viscosity varies according to the polyester resin syrup and the type and nature (i.e., the manner of preparation) of the extender material. In all situations, however, the lowest possible viscosity due to the particle size distribution may be determined by those of ordinary skills in the art by routine experimentation. Thus, for example, an extender material containing from about 55–70% by weight of SB-332 (which is characterized by 99.5% of the particles passing through a 325 mesh sieve) and correspondingly 45–30% by weight of aluminum trihydrate available from the Aluminum Company of America as C-31 (which is characterized by 0–1% of the particles being retained on a 100 mesh sieve, 5–10% of the particles being retained on a 200 mesh sieve, 30–65% of the particles being retained on a 325 mesh sieve and 35–70% of the particles being passed through a 325 mesh sieve) yields a composition mixture having a lower viscosity than that mixture containing an identical amount of only SB-332.

In those situations where structural strength is an important consideration, such as in the preparation of building panels, from about 10 to about 30%, based on the total weight of the composition, of a reinforcing filler material may be included in the composition. As used in the present specification, the term "total weight" refers to the total of the weight of the resin syrup, the dry weight of the basic aluminum chloride, the weight of the extender material and the weight of the reinforcing filler material. The reinforcing filler material typically has a fibrous consistency and may include glass fibers, asbestos fibers, cellulosic fibers, graphite fibers, plastic fibers, metal fibers, mineral wool, expanded metal lath, etc., and combinations thereof. Glass fibers are especially preferred due to their excellant fire properties, strength, availability and low cost.

To obtain the highly extended, unsaturated polyester resin syrup composition containing basic aluminum chloride, it has been found that it is necessary to combine the ingredients of the composition via a particular process. If this process is not followed, the initial viscosity of the composition mixture, (i.e., the viscosity within about 1 minute after mixing all the ingredients) increases to the extent that handling the composition mixture with conventional mixing and shaping apparatus is no longer possible. In general, a workable composition mixture has an initial viscosity of less than about 100,000 centipoise, preferably less than about 25,000 centipoise and most preferably less than about 10,000 centipoise, when measured with a Brookfield Model RVT Viscometer with a No. 5 Spindle at 20 RPM. It is to be understood, however, that higher viscosities may be utilized if specialized equipment is employed.

Specifically, the process involves the preparation of a first component comprising unsaturated polyester resin syrup and non-reinforcing extender material and a second component comprising basic aluminum chloride, preferably in solution form, and non-reinforcing extender material. In general, the first and second components are formed immediately before they are mixed together, however, premixed first and second components may also be used. The first and second components are then mixed together in any conventional mixing apparatus for about 1 to about 5 minutes to form a generally thixotropic composition mixture, which is shaped into the configuration of the desired article and allowed to cure. In mixing the first and second components, it is important that a substantially homogeneous mixture be obtained to enable the composition mixture to cure into the thermoset, cured, cross-linked, extended, unsaturated polyester resin syrup composition of the present invention having maximum strength characteristics.

While additional components containing additional quantities of resin syrup, basic aluminum chloride solution and extender material may be employed in the process, in the interest of brevity and clarity, the process has been described with two components. It is to be understood, however, that the present invention encompasses those situations in which more than two components are employed.

Where reinforcing filler material is desired, the material may be added to either of the individual components before they are mixed, added during the mixing of the components or, preferably, added after the components have been mixed to form the composition mixture.

The working life of the composition mixture (i.e., the time, after mixing the components, during which the composition mixture may be shaped into the desired configuration) may vary depending on numerous factors including ambient temperature, the type and amount of resin syrup, the type and amount of basic aluminum chloride, the type and amount of extender and reinforcing material, and the type and amount of other additives, especially the accelator, which are described below. Typically, the working life ranges from about 2 minutes to about 30 minutes. Based on similar considerations, the time necessary to cure the resin syrup in the composition mixture may range from about 5 minutes to about 2 hours. Where structural strength is a consideration, the cured, cross-linked, highly extended, unsaturated polyester resin syrup composition of the present invention is typically allowed to "set", wherein substantially complete polymerization and cross-linking is obtained, for about 2 days to about 7 days after curing, before being utilized.

During the time the composition mixture is forming the cured, cross-linked, highly extended, unsaturated polyester resin syrup composition, some of the water originally present in the aqueous basic aluminum chloride solution evaporates. This evaporation causes from about $\frac{1}{2}$ to about $\frac{3}{4}$% shrinkage. After the composition mixture cures, additional evaporation causes the formation of voids, but does not yield further shrinkage. The total amount of water lost by evaporation is generally about 30% by weight of the basic aluminum chloride solution initially present.

As stated above, one way of avoiding shrinkage of the composition is by employing an extender material which includes plaster of Paris. As the plaster of Paris hydrates, it prevents the water in the composition mixture from escaping by evaporation. The amount of plaster of Paris which is necessary to obviate shrinkage is dependent on a number of factors including ambient conditions, composition, etc., and may readily be determined by routine experimentation. Although the plaster of Paris may be added to either component, it is preferably added to the component which does not contain the aqueous basic aluminum chloride solution so as to yield a composition mixture possessing a longer working life.

A further advantage of using plaster of Paris is that by varying the setting time of the plaster of Paris with respect to the curing of the resin syrup, the structural characteristics of the composition may be altered. For example, if the plaster of Paris is allowed to set before the resin syrup cures, a relatively inflexible composition results. On the other hand, if the plaster of Paris is allowed to set after the resin syrup cures, a relatively flexible composition is obtained. To obtain these structural characteristics, the cure time of the resin syrup may be regulated by selecting the appropriate type and amount of initiator and/or accelerator. Similarly, the setting time of the plaster of Paris may be retarded by adding small amounts of an acidic material, such as an aluminum sulfate solution, to the component containing the plaster of Paris. In this regard, it has been found that the aluminum sulfate solution provides an additional advantage in that it reduces the viscosity of the component containing the plaster of Paris which in turn reduces the viscosity of the overall composition mixture.

A further important aspect of the process is that the viscosity of the individual components must be maintained at a level so that they may be mixed together to form a workable composition mixture. In particular, the viscosity of one component and, preferably both components, is generally less than about 20,000 centipoise, preferably less than about 10,000 centipoise, when measured by the above-described viscometer, spindle and rotational speed. It is understood, however, that the viscosity of the overall composition mixture is a more important consideration since it is the composition mixture which will be employed to form the shaped article.

The viscosity of the individual components is primarily dependent on the amount of extender material in the component compared to the amount of resin syrup or basic aluminum chloride solution present. Thus, in the first component, the weight ratio of extender material to resin syrup is generally less than about 2.0:1.0, and preferably from about 1.4:1.0 to about 1.0:1.0. In the second component, the weight ratio of extender material to basic aluminum chloride solution is generally less than about 2.5:1.0 and preferably from about 2.0:1.0 to about 1.0:1.0. of Further importance is that the total amount of extender material employed be divided between the first and second components such that the components and the composition mixture are workable (i.e., capable of being handled by conventional mixing and shaping apparatus). Although the precise acceptable proportions of extender material in the components will vary according to the ingredients used, as may readily be determined by routine experimentation, it is preferred that the extender material be divided such that the viscosity of each component is approximately equal.

In addition to the unsaturated polyester resin syrup, basic aluminum chloride and extender material, the components may include conventional additives such as initiators, accelerators, surfactants, fire retardants, etc. in amounts well known to those of ordinary skill in the art.

Typical initiators for the unsaturated polyester resin syrup includes peroxy compounds such as benzoyl peroxide, cumene hydroperoxide, tertiary butyl peroxide and the like. A particularly useful peroxy initiator for room temperature curing is 2,5-dimethyl hexane-2,5-dimethyl-diper-2-ethyl hexoate. The peroxy initiators customarily are provided in the form of pastes in which the peroxy material is dispersed in a glycol. Accelerators for the peroxy initiators include, amines, cobalt naphthenate and cobalt octoate.

Surfactants may also be incorporated into either of the components. The surfactants, which are added to obtain a smoother consistency and a composition mixture having a slightly reduced viscosity, include the non-ionic, ethoxylated triglycerides which are available from Emery Chemical Company under the names Trylox CO-30 or Trylox CO-200/50. A further advantage of using a surfactant is in those situations where a press-molded article is desired and there is less than 5% by weight of plaster of Paris in the composition mixture. In these instances, the surfactant serves to help prevent the tendency of the resin syrup to separate from the inorganic ingredients around the edges of the mold when the composition mixture is press molded. However, in all situations, the use of a surfactant tends to slightly reduce the strength characteristics of the cured article.

It is generally preferable to incorporate the additives into one or both of the individual components before they are mixed together. For example, while a surfactant may be added to either or both of the components, it is preferable to add a surfactant to the component containing the resin syrup. Similarly, it is generally desirable to add an initiator to the component containing the resin syrup, while adding an accelerator to the component containing the basic aluminum chloride. However, where lower viscosity composition mixtures are obtained, (e.g., by using extender material that has the viscosity reducing particle size distribution) the initiator and accelerator may be added to the composition mixture immediately before the mixture is shaped.

The individual components are separately mixed so that they each form a substantially homogeneous blend of ingredients wherein the particles of extender material are wet with the liquid phase of the respective components. Although the mixing time may vary according to numerous factors such as the type of mixing device used, the relative amounts of ingredients, ambient conditions, etc., it generally is in the range of from about 5 to about 30 minutes.

A further reduction in the viscosity of the individual components and in the composition mixture may be obtained by removing entrained gases, e.g., air, from the components. This is achieved by placing the components under vacuum for about 1 to 5 minutes, preferably under mild agitation. In this manner, it is believed that the liquid present in the components can more fully wet the particles and thus reduce the viscosity on the components which in turn reduces the viscosity of the composition mixture when the components are mixed together. In most instances, however, the individual components and the composition mixture are prepared at ambient conditions.

The cured, cross-linked, highly extended, unsaturated polyester resin syrup composition of the present invention possesss excellant structural strength and fire properties, particularly where glass fibers are incorporated into the composition. When exposed to fire, the composition resists burning due to its low fuel (resin syrup) content. In this regard, it will be noted that the presence of basic aluminum chloride additionally benefits the composition by further reducing the proportionate amount of resin syrup in the composition. Even when burning occurs, the smoke level is low and the structural integrity of the composition is maintained. In those embodiments of the present invention wherein the extender material includes aluminum trihydrate, the cured composition will exhibit further improved fire properties due to the ability of aluminum trihydrate to release fire and smoke suppressing water vapor as it is heated.

Improvements in fire properties may also be obtained by employing a polyester resin syrup which in itself possesses good fire properties or by incorporating known fire retardant additives in the composition. For example, a fire resistant polyester resin syrup may be obtained by preparing the polyester resin from a polyol or polycarboxylic acid or anhydride having a high halogen content such as hexachloroendomethylene tetrahydrophthalic anhydride or tetrabromophthalic anhydride. Exemplary of the additives is the combination of an aromatic halide with a Group Va metal compound such as antimony trioxide. A complete discussion of conventional methods of imparting good fire properties to polyesters, which is applicable to the composition of the present invention, may be found in an article by C. W. Roberts in Society of Plastic Engineers Transactions, Vol. 3, No. 2, pp. 111–116, Apr. 1963, the content of which is incorporated by reference in the interest of brevity.

In a preferred embodiment of the present invention, a building panel possessing excellant strength and fire properties may be obtained. In this embodiment, the first component comprises a homogenous blend of unsaturated polyester resin syrup, aluminum trihydrate and/or plaster of Paris and, preferably, a surfactant and an initiator, while the second component comprises a homogenous blend of aqueous basic aluminum chloride solution, aluminum trihydrate and, preferably, an accelator. The two components are mixed together to form the composition mixture which is then mixed with reinforcing filler material, preferably, glass fibers. The resulting mixture is then shaped into the desired configuration and allowed to cure and set.

A further understanding of the present invention may be obtained with reference to the following examples. It is to be understood, however, that the invention is not limited to the embodiments described in the examples.

EXAMPLE I

This example illustrates that merely adding a solution of basic aluminum chloride to an extended, unsaturated polyester resin syrup composition does not reduce the viscosity of the composition to a workable level.

An unsaturated polyester resin syrup is prepared by combining 25 parts, by weight, of styrene and 75 parts, by weight, of an unsaturated polyester resin. The polyester resin is obtained by reacting 60 moles of phthalic anhydride, 40 moles of maleic anhydride and 106 moles of propylene glycol.

500 grams of the above unsaturated polyester resin syrup is mixed with 1,000 grams of aluminum trihydrate (SB-332) and 20 grams of surfactant (10 grams Trylox CO-30 and 10 grams Trylox CO-200/50). To this composition mixture is added aliquots of a 50% aqueous solution of basic aluminum chloride (Wickenol 308). After each aliquot is added, the viscosity of the composition mixture is taken.

The viscosity of the composition mixture is determined using a Brookfield Model RVT Viscometer with a No. 7 spindle at 10 RPM.

| Total Basic Aluminum Chloride Solution Added (grams) | Viscosity (Centipoise) |
| --- | --- |
| 0 | 230,000 |
| 75 | 348,000 |
| 150 | 252,000 |
| 225 | 220,000 |
| 300 | 308,000 |
| 375 | 360,000 |
| 450 | 152,000 |
| 500 | * |

*The mixture is stirred for several minutes. The system does not form a homogenous mass.

EXAMPLE II

This example illustrates the effect on viscosity of incorporating aqueous basic aluminum chloride solution into a composition mixture prepared from two components. Mixing of the various components was performed with the mixer described in U.S. Pat. No. 2,753,162. The viscosity is determined using a Brookfield Model RVT Viscometer with a No. 6 spindle at 20 RPM.

(A) Component 1

500 grams of the unsaturated polyester resin syrup described in Example I is mixed with 500 grams of aluminum trihydrate (SB-332), 10 grams of Trylox CO-30 and 10 grams Trylox CO-200/50 to give a homogenous blend.

Component 2

250 grams of water is thoroughly mixed with 500 grams of aluminum trihydrate (SB-332). Components 1 and 2 are mixed together for several minutes and the resulting composition mixture has a viscosity of 22,500 centipoise.

(B) Component 1

500 grams of the unsaturated polyester resin syrup described in Exammple I is mixed with 500 grams of aluminum trihydrate (SB-332), 10 grams of Trylox CO-30 and 10 grams Trylox CO-200/50 to give a homogenous blend.

Component 2

500 grams of a 50% aqueous basic aluminum chloride solution (Wickenol 308) is mixed with 500 grams of aluminum trihydrate (SB-332) to give a homogenous blend.

Components 1 and 2 are mixed together for several minutes and the resulting composition mixture has a viscosity of 8,500 centipoise. It will be noted that this viscosity is significantly lower than the sample in (A), even though the composition is more highly extended due to the presence of 250 grams (dry weight) of basic aluminum chloride.

EXAMPLE III

This example illustrates the effect on the viscosity of the composition mixture by varying the amount of extender material in the first and second components. The total amount of extender material in the composition mixture is identical for all samples.

The unsaturated polyester resin syrup, the basic aluminum chloride solution and the aluminum trihydrate in the samples are described in Example I. The components are prepared as described in Example II. The viscosity of the composition mixture is determined using a Brookfield Model RVT Viscometer with a No. 6 spindle at 50 RPM.

|  | A | B | C | D | E | F |
| --- | --- | --- | --- | --- | --- | --- |
| Component 1 | | | | | | |
| Resin Syrup (grams) | 500 | 500 | 500 | 500 | 500 | 500 |
| Aluminum Trihydrate (grams) | 500 | 300 | 400 | 500 | 600 | 700 |
| CO-30 (grams) | 10 | 10 | 10 | 10 | 10 | 10 |
| CO-200/50 (grams) | 10 | 10 | 10 | 10 | 10 | 10 |
| Component 2 | | | | | | |
| Basic aluminum chloride solution (grams) | 0 | 500 | 500 | 500 | 500 | 500 |
| Aluminum Trihydrate (grams) | 500 | 700 | 600 | 500 | 400 | 300 |
| Composition Mixture Viscosity (Centipoise) | 230,000 | 21,500 | 10,800 | 5,300 | 8,000 | * |

*This sample does not form a homogenous composition mixture but separates into two phases before an accurate viscosity measurement may be taken.

EXAMPLE IV

This example illustrates the strength and fire properties of a cured, cross-linked, highly extended, unsaturated polyester resin syrup composition of the present invention.

Component 1

500 grams of the unsaturated polyester resin syrup described in Example 1 is mixed with 500 grams of aluminum trihydrate (SB-332), 40 grams of 55% active BPO* paste, 10 grams of Trylox CO-30 and 10 grams of Trylox CO-200/50 to give a homogeneous blend.

* BPO paste is a 55% by weight solution of benzoyl peroxide in plasticizer and is available from Noury Chemical Company under the name BSP-55.

Component 2

500 grams of a 50% aqueous basic aluminum chloride solution (Wickenol 308) is blended with 500 grams of aluminum trihydrate (SB-332) and 2 grams of phenylethylethanolamine (an accelerator available from Eastman Chemical Company ) to give a homogenous blend.

Components 1 and 2 are mixed together to give a homogenous mixture which is poured into a press mold having the dimensions 21 inches by 21 inches by ⅛ inch containing two continuous strand glass mats having the dimensions 20.5 inches by 20.5 inches, 2 oz. per ft². The press is closed and a pressure of 10 lb./sq. inch is applied. The resin syrup cures in about 15 to about 20 minutes. The resulting panel is removed from the mold and allowed to set for 7 days at laboratory (i.e. ambient) conditions.

The structural strength of the panel is determined by ASTM D790 and is as follows:

| | | |
|---|---|---|
| Flexural Strength | ($\times 10^3$ psi) | 12.46 |
| Flexural Modulus | ($\times 10^6$ psi) | .74 |
| Tensile Strength | ($\times 10^3$ psi) | 6.86 |
| Tensile Modulus | ($\times 10^6$ psi) | .81 |
| Compressive Strength | ($\times 10^3$ psi) | 6.76 |

To test the fire properties of the panel, a 6 inch by 6 inch by ⅛ inch sample is mounted with a clamp at a 45° C. angle. The tip of a one inch flame from a propane torch is impinged on the center of the sample. During the test period, white smoke, but no flames, issues from the sample. After one hour, the test is discontinued. An oval region approximately 2.5 inches in diameter is burned out. The remaining material is continuous and intact with little or no surface erosion.

To determine the flame spread of the prepared panel, samples are tested using the Monsanto Tunnel Test and are compared with an asbestos board sample and a standard sample composed of redwood. The tunnel is 2 feet long, 3 inches wide and, is on an incline of 45° C. The test period is 5 minutes. A complete description of the test apparatus and conditions are set forth in Journal of Paint Technology, Vol. 39, No. 511, August 1967, (p. 494). The flame source is a Meeker burner burning natural gas. All tests were run in triplicate to ensure the accuracy of the test results.

| Material | Flame Distance in Tunnel (inches) |
|---|---|
| Redwood (standard) | 16.0 |
| Sample | 9.5 |
| Asbestos Board | 6.0 |

EXAMPLE V

This example illustrates the effect on fire properties caused by varying the components in the composition.

The unsaturated polyester resin syrup, the 50% aqueous basic aluminum chloride solution and the aluminum trihydrate in the samples are described in Example I. The plaster of Paris is calcium sulfate hemihydrate available from U.S. Gypsum Co., as Hydrocal White.

The first and second components are prepared as in Example II. In the first component of all the samples is included 1% benzoyl peroxide, as an initiator, 1% Trylox CO 30 and 1% Trylox CO-200/50. In the second component of all the samples (except sample B), is included 0.05% phenylethylethanolamine, as an accelerator. All percentages are expressed on a weight basis.

The samples are prepared by forming a homogenous composition mixture from the first and second components. The composition mixture is poured into a circular mold 6 inches in diameter and ⅛ inch deep. Th samples are covered with polyethylene film and allowed to cure for 24 hours. The polyethylene film is removed and the samples are then allowed to set for 7 days at laboratory conditions before being tested.

The samples are tested by mounting them parallel to horizontal and applying a one inch flame from a Bunsen burner on the bottom surface of the sample, approximately one inch from the edge.

The components of each sample are set forth in Table I and the fire properties of each sample are set forth in Table II.

TABLE I

| | Sample | | | | | | | |
|---|---|---|---|---|---|---|---|---|
| | A | B | C | D | E | F | G | H |
| Component 1 (grams) | RS 200 | RS 250 | RS 200 | RS 200 | RS 100 | RS 100 | RS 100 | RS 100 |
| | ATH 200 | ATH 500 | POP 200 | POP 200 | POP 100 | POP 100 | POP 100 | POP 100 |
| Component 2 (grams) | BAC 200 | NONE | BAC 200 | BAC 200 | $H_2O$ 100 | H hd 20 50 | $H_2O$ 100 | $H_2O$ 50 |
| | ATH 200 | NONE | ATH 200 | POP 200 | ATH 100 | ATH 100 | POP 100 | POP 100 |

RS = Unsaturated resin syrup
ATH = Aluminum trihydrate
BAC = Basic aluminum chloride solution
POP = Plaster of Paris (Ca $SO_4$ . ½$H_2O$)
$H_2O$ = Water

TABLE II

| SAMPLE | Time to Secondary Burning | Smoke Level | Smoke Color | Time to Sample Burn Through | After Burning | After Glow | Sample Integrity After Test | Deformation | Comments |
|---|---|---|---|---|---|---|---|---|---|
| A | 1 minute | Very low | White | 7 minutes | 15 sec. | 0 | Good | Slight | Acceptable |
| B | 1 minute | Low | Black & White | 5 minutes | * | * | None | Extreme | Sample disintegration during test |
| C | 1 minute | Low | White | 1 hour | 0 | 0 | Excellant | None | Acceptable |
| D | 1 minute | Low | Black & White | 1 hour | 0 | 0 | Excellant | Very Slight | Acceptable |
| E | 15 seconds | Heavy | Black | 30 min. | * | * | None | Extreme | Sample burns independent of burner and cracks badly |
| F | 30 seconds | Heavy | Black | 30 min. | * | * | None | Slight | Sample burns and cracks |
| G | 10 seconds | Heavy | Black | 30 min. | * | * | Low | Slight | Sample burns and cracks |
| H | 20 seconds | Very Heavy | Black | 30 min. | * | * | Fair | Slight | Sample burns up |

*See related comment.

EXAMPLE VI

This example illustrates the strength properties of a cured, cross-linked, highly extended, unsaturated polyester resin syrup composition of the present invention which does not contain any surfactant but which employs extender material having the particle size distribution discussed above.

Component 1

375 grams of the unsaturated polyester resin syrup described in Example I is mixed with 291 grams of aluminum trihydrate (SB-332), 166 grams of aluminum trihydrate (C-31) and 3 grams of phenylethylethanolamine to give a homogenous blend.

Component 2

375 grams of a 50% aqueous basic aluminum chloride solution (Wickenol 308) is blended with 417 grams of aluminum trihydrate (SB-332), 266 grams of aluminum trihydrate (C-31) and 20 grams of BPO paste to give a homogenous blend.

Componwnts 1 and 2 are mixed together to give a homogenous mixture. 250 grams of the mixture is poured into a press mold having dimensions 6 inches by 9 inches by ⅛ inch containing 2 continuous strand glass mats having dimensions 5.75 inches by 8.75 inches, 1.5 oz. per ft$^2$. The press is closed and a pressure of about 15 lb./sq. inch is applied. The resin syrup cures in about 4 to 5 minutes. The resulting panel is removed from the mold and allowed to set for 7 days at laboratory conditions.

The panel exhibits the following strength values:

| Flexural Strength | ($\times 10^3$ psi) | 13.6 |
|---|---|---|
| Flexural Modulus | ($\times 10^6$ psi) | 1.2 |

EXAMPLE VII

This example shows the flexural strength of a cured, cross-linked, highly extended, unsaturated polyester resin syrup composition of the present invention.

Component 1

375 grams of the unsaturated polyester resin syrup described in Example I is mixed with 166 grams of aluminum trihydrate (SB-332), 125 grams of plaster of Paris (CaSO$_4$ . ½H$_2$O), 166 grams of aluminum trihydrate (C-31), 15 grams of (CO-30, 15 grams of CO 200/50 and 1 grams of phenylethylethanolamine to give a homogenous blend.

Component 2

375 grams of a 50% aqueous basic aluminum chloride solution (Wickenol 308) is blended with 417 grams of aluminum trihydrate (SB-332), 126 grams of aluminum trihydrate (C-31), 30 grams of BPO paste and 3 grams of AL$_2$ (SO$_4$)$_3$ to give a homogenous blend.

Components 1 and 2 are mixed together to give a homogenous mixture. 250 grams of this mixture are used to prepare a panel in accordance with Example VI.

The panel has a flexural strength of 13.3 $\times 10^3$ psi.

EXAMPLE VIII

This example illustrates how the use of an extender material comprised of at least a portion of plaster of Paris eliminates shrinkage of the shaped article during the curing process.

A first test panel is prepared in accordance with the conditions set forth in Example VI. Concurrently therewith, a second test panel is prepared in accordance with the conditions set forth in Example VII. The two test panels are allowed to set side by side for 7 days at laboratory conditions. At the end of this time period, the length of the test panels is measured. The test panel made under the conditions of Example VII (containing plaster of Paris) measures exactly 9 inches (i.e., no shrinkage). The test panel made under the conditions of Example VI (containing no plaster of Paris) measures 8 15/16 inches (i.e., 0.69% shrinkage).

EXAMPLES IX–XLV

These examples (as summarized in Table III) illustrate the viscosity of the first component, second component and composition mixture of various embodiments of the present invention.

The unsaturated polyester resin syrup is prepared by combining 35 or 40 parts, by weight, of sytrene and corresponding 65 or 60 parts by weight, of unsaturated polyester resin. The unsaturated polyester resin is obtained by reacting 60 moles of phthalic anhydride, 40 moles of noleic anhydride and 106 moles of propylene glycol. The first component is prepared by mixing the indicated amount of unsaturated polyester resin syrup with the indicated amount of extender material until a homogenous blend is obtained. In examples X-XLV, the first component also includes 7 grams of Trylox CO-30 and 7 grams of Trylox CO-200/50.

The second component is prepared by mixing the indicated amount of a 50% aqueous basic aluminum chloride solution (Wickenol 308) with the indicated amount of extender material until a homogenous blend is obtained. In example IX, the second component includes 10 grams of an aqueous solution containing 27%, by weight, of $AL_2SO_4)_3$. In examples X-XXII and XXVIII-XLV, the second component includes 3 grams of the same aqueous solution of $AL_2(SO_4)_3$.

The first and second components are then mixed together to yield a homogenous blend.

All viscosity measurements are determined using a Brookfield Model, RVT Viscometer with the indicated spindle number and rotational speed.

In Table III, the superscript (1) indicated an unsaturated polyester resin syrup containing 35 parts, by weight, of styrene. The superscript (2) indicates 40 parts, by weight, of styrene. The abbreviations BAC, POP and ATH have the same meanings as used in Table I.

TABLE III

| EXAMPLE | Component 1 Resin Syrup (grams) | Extender Material (grams) | Spindle/RPM | Viscosity (centipoise) | Component 2 BAC (grams) | Extender Material (grams) | Spindle/RPM | Viscosity (centipoise) | Composition Mixture Spindle/RPM | Viscosity (centipoise) |
|---|---|---|---|---|---|---|---|---|---|---|
| IX | 500[1] | POP 500 | 5/10 | 2,400 | 500 | POP 500 | 5/10 | 400 | 5/10 | 26,400 |
|  |  |  | 5/20 | 2,400 |  |  | 5/20 | 300 | 5/20 | 18,200 |
| X | 500[1] | POP 500 | 5/10 | 16,000 | 500 | POP 500 | 5/10 | 300 | 5/10 | 12,000 |
|  |  |  | 5/20 | 4,600 |  |  | 5/20 | 1000 | 5/20 | 9,800 |
| XI | 400[1] | POP 500 | 6/10 | 45,000 | 500 | POP 500 | 4/10 | 800 | 5/10 | 4,400 |
|  |  |  | 6/20 | 25,000 |  |  | 4/20 | 700 | 5/20 | 4,200 |
| XII | 300[1] | POP 500 | 6/1 | 700,000 | 500 | POP 500 | 4/10 | 1,000 | 5/10 | 3,400 |
|  |  |  | 6/2.5 | 368,000 |  |  | 4/20 | 1,000 | 5/20 | 4,000 |
| XIII | 500[1] | POP 500 | 5/10 | 16,000 | 500 | POP 650 | 4/10 | 1,800 | 6/10 | 14,000 |
|  |  |  | 5/20 | 4,600 |  |  | 4/20 | 1,400 | 6/20 | 11,250 |
| XIV | 400[1] | POP 500 | 6/10 | 45,000 | 500 | POP 650 | 4/10 | 1,800 | 5/10 | 6,600 |
|  |  |  | 6/20 | 25,000 |  |  | 4/20 | 1,400 | 5/20 | 6,300 |
| XV | 300[1] | POP 500 | 6/1 | 700,000 | 500 | POP 650 | 4/10 | 1,800 | 5/10 | 5,600 |
|  |  |  | 6/2.5 | 368,000 |  |  | 4/20 | 1,400 | 5/20 | 4,700 |
| XVI | 500[1] | POP 500 | 5/10 | 19,800 | 500 | ATH 500 | 4/10 | 300 | 5/10 | 9,000 |
|  |  |  | 5/20 | 12,200 |  |  | 4/20 | 300 | 5/20 | 7,200 |
| XVII | 400[1] | POP 500 | 5/10 | 16,800 | 500 | ATH 500 | 4/10 | 300 | 5/10 | 4,000 |
|  |  |  | 5/20 | 11,400 |  |  | 4/20 | 300 | 5/20 | 4,000 |
| XVIII | 300[1] | POP 500 | 6/10 | 65,000 | 500 | ATH 500 | 4/10 | 300 | 5/10 | 4,000 |
|  |  |  | 6/20 | 43,000 |  |  | 4/20 | 300 | 5/20 | 4,000 |
| XIX | 500[1] | POP 500 | 5/10 | 19,800 | 500 | ATH 650 | 4/10 | 1,200 | 5/10 | 11,200 |
|  |  |  | 5/20 | 12,200 |  |  | 4/20 | 1,100 | 5/20 | 9,600 |
| XX | 400[1] | POP 500 | 5/10 | 34,400 | 500 | ATH 650 | 4/10 | 1,200 | 5/10 | 4,800 |
|  |  |  | 5/20 | 56,000 |  |  | 4/20 | 1,100 | 5/20 | 4,600 |
| XXI | 300[1] | POP 500 | 6/10 | 66,000 | 500 | ATH 650 | 4/10 | 1,200 | 5/10 | 6,000 |
|  |  |  | 6/20 | 45,500 |  |  | 4/20 | 1,100 | 5/20 | 5,800 |
| XXII | 500[1] | ATH 500 | 5/10 | 3,000 | 500 | ATH 500 | 4/10 | 200 | 5/10 | 10,800 |
|  |  |  | 5/20 | 2,600 |  |  | 4/20 | 200 | 5/20 | 7,400 |
| XXIII | 400[1] | ATH 500 | 5/10 | 11,200 | 500 | ATH 500 | 4/10 | 300 | 5/10 | 21,200 |
|  |  |  | 5/20 | 9,400 |  |  | 4/20 | 300 | 5/20 | 13,000 |
| XXIV | 300[1] | ATH 500 | 6/10 | 42,000 | 500 | ATH 500 | 4/10 | 300 | 5/10 | 19,600 |
|  |  |  | 6/20 | 29,000 |  |  | 4/20 | 300 | 5/20 | 12,600 |
| XXV | 500[1] | ATH 500 | 5/10 | 5,000 | 500 | ATH 650 | 4/10 | 800 | 5/10 | 35,600 |
|  |  |  | 5/20 | 2,600 |  |  | 4/20 | 800 | 5/20 | 60,800 |
| XXVI | 400[1] | ATH 500 | 5/10 | 11,200 | 500 | ATH 650 | 4/10 | 800 | 5/10 | 16,600 |
|  |  |  | 5/20 | 9,400 |  |  | 4/20 | 800 | 5/20 | 10,000 |
| XXVII | 300[1] | ATH 500 | 6/10 | 42,000 | 500 | ATH 650 | 4/10 | 800 | 6/10 | 42,000 |
|  |  |  | 6/20 | 29,000 |  |  | 4/20 | 800 | 6/20 | 26,500 |
| XXVIII | 500[2] | POP 500 | 5/10 | 17,200 | 500 | POP 500 | 4/10 | 600 | 5/10 | 6,800 |
|  |  |  | 5/20 | 11,600 |  |  | 4/20 | 500 | 5/20 | 6,000 |
| XXIX | 400[2] | POP 500 | 6/10 | 53,000 | 500 | POP 500 | 4/10 | 600 | 5/10 | 4,800 |
|  |  |  | 6/20 | 34,000 |  |  | 4/20 | 500 | 5/20 | 4,300 |
| XXX | 300[2] | POP 500 | 7/10 | 168,000 | 500 | POP 500 | 4/10 | 600 | 5/10 | 4,200 |
|  |  |  | 7/20 | 90,000 |  |  | 4/20 | 500 | 5/20 | 3,600 |
| XXXI | 500[2] | POP 500 | 5/10 | 17,200 | 650 | POP 500 | 4/10 | 1,600 | 5/10 | 8,000 |
|  |  |  | 5/20 | 11,600 |  |  | 4/20 | 1,600 | 5/20 | 6,700 |
| XXXII | 400[2] | POP 500 | 6/10 | 53,000 | 650 | POP 500 | 4/10 | 1,600 | 5/10 | 4,800 |
|  |  |  | 6/20 | 34,000 |  |  | 4/20 | 1,600 | 5/20 | 4,400 |
| XXXIII | 300[2] | POP 500 | 7/10 | 168,000 | 650 | POP 500 | 4/10 | 1,600 | 5/10 | 5,600 |
|  |  |  | 7/20 | 90,000 |  |  | 4/20 | 1,600 | 5/20 | 5,000 |
| XXXIV | 500[2] | POP 500 | 5/10 | 20,800 | 500 | ATH 500 | 4/10 | 300 | 5/10 | 9,200 |
|  |  |  | 5/20 | 13,200 |  |  | 4/20 | 300 | 5/20 | 7,700 |
| XXXV | 400[2] | POP 500 | 6/10 | 53,000 | 500 | ATH 500 | 4/10 | 300 | 5/10 | 6,000 |
|  |  |  | 6/20 | 34,000 |  |  | 4/20 | 300 | 5/20 | 5,200 |
| XXXVI | 300[2] | POP 500 | 7/10 | 168,000 | 500 | ATH 500 | 4/10 | 300 | 5/10 | 3,200 |
|  |  |  | 7/20 | 90,000 |  |  | 4/20 | 300 | 5/20 | 3,200 |
| XXXVII | 500[2] | POP 500 | 5/10 | 20,800 | 500 | ATH 650 | 4/10 | 600 | 5/10 | 16,800 |
|  |  |  | 5/20 | 18,200 |  |  | 4/20 | 450 | 5/20 | 12,800 |
| XXXVIII | 400[2] | POP 500 | 6/10 | 53,000 | 500 | ATH 650 | 4/10 | 600 | 5/10 | 8,000 |
|  |  |  | 6/20 | 34,000 |  |  | 4/20 | 450 | 5/20 | 7,000 |

TABLE III-continued

| | Component 1 | | | | | Component 2 | | | Composition Mixture | |
|---|---|---|---|---|---|---|---|---|---|---|
| EXAMPLE | Resin Syrup (grams) | Extender Material (grams) | Spindle/ RPM | Viscosity (centipoise) | BAC (grams) | Extender Material (grams) | Spindle/ RPM | Viscosity (centipoise) | Spindle/ RPM | Viscosity (centipoise) |
| XXXIX | 300[2] | POP 500 | 7/10 | 168,000 | 500 | ATH 650 | 4/10 | 600 | 5/10 | 6,400 |
| | | | 7/20 | 90,000 | | | 4/20 | 450 | 5/20 | 6,100 |
| XL | 500[2] | ATH 500 | 5/10 | 1,200 | 500 | ATH 500 | 4/10 | 300 | 5/10 | 18,000 |
| | | | 5/20 | 9,200 | | | 4/20 | 300 | 5/20 | 12,100 |
| XLI | 400[2] | ATH 500 | 5/5 | 50,400 | 500 | ATH 500 | 4/10 | 300 | 5/10 | 20,800 |
| | | | 5/10 | 36,800 | | | 4/20 | 300 | 5/20 | 14,000 |
| XLII | 300[2] | ATH 500 | 7/10 | 220,000 | 500 | ATH 500 | 4/10 | 300 | 5/10 | 20,400 |
| | | | 7/20 | 142,000 | | | 4/20 | 300 | 5/20 | 13,800 |
| XLIII | 500[2] | ATH 500 | 5/10 | 1,200 | 500 | ATH 650 | 4/10 | 1,200 | 5/10 | 28,000 |
| | | | 5/20 | 9,200 | | | 4/20 | 1,100 | 5/20 | 18,800 |
| XLIV | 400[2] | ATH 500 | 5/5 | 50,400 | 500 | ATH 650 | 4/10 | 1,200 | 6/10 | 49,000 |
| | | | 5/10 | 36,800 | | | 4/20 | 1,100 | 6/20 | 30,500 |
| XLV | 300[2] | ATH 500 | 7/10 | 220,000 | 500 | ATH 650 | 4/10 | 1,200 | 6/10 | 33,000 |
| | | | 7/20 | 142,000 | | | 4/20 | 1,100 | 6/20 | 23,500 |

Although the invention has been described with preferred embodiments, it is to be understood that variations and modifications may be resorted to as will be apparent to those skilled in this art. Such variations and modifications are to be considered within the scope of the following claims.

I claim:

1. A highly extended, unsaturated polyester resin syrup composition mixture comprising:
    (a) unsaturated polyester resin syrup composed of an unsaturated polyester resin and an ethylenically unsaturated copolymerizable monomer;
    (b) basic aluminum chloride having the formula $$Al_2(OH)_xCl_{6-x}$$

wherein x is 3, 4 or 5; and
    (c) non-reinforcing extender material,
wherein the dry weight ratio of the sum of the extender material and the basic aluminum chloride to the resin syrup is from about 2.0:1.0 to about 8.5:1.0 and wherein the dry weight ratio of extender material to basic aluminum chloride is less than about 7.5:1.0.

2. The composition mixture of claim 1 wherein the extender material includes one member selected from the group consisting of aluminum trihydrate, plaster of Paris, and combinations thereof.

3. The composition mixture of claim 2 wherein the composition mixture includes from about 10 to about 30% of reinforcing filler material, based on the total weight of the composition mixture.

4. The composition mixture of claim 3 wherein the reinforcing filler material comprises glass fibers.

5. The composition mixture of claim 4 wherein the dry weight ratio of the sum of the extender material and the basic aluminum chloride to the resin syrup is from about 2.5:1.0 to about 6.5:1 and wherein the dry weight ratio of extender material to basic aluminum chloride is from about 4.0:1.0 to about 7.0:1.0.

6. A highly extended, unsaturated polyester resin syrup composition mixture comprising:
    (a) from about 12 to about 30%, by weight, of unsaturated polyester resin syrup composed of an unsaturated polyester resin and an ethylenically unsaturated copolymerizable monomer;
    (b) from about 5 to about 30%, by dry weight, of basic aluminum chloride having the formula $$Al_2(OH)_xCl_{6-x}$$

wherein x is 3, 4 or 5; and
    (c) from about 50 to about 80%, by weight of non-reinforcing extender material.

7. The composition mixture of claim 6 wherein the extender material includes one member selected from the group consisting of aluminum trihydrate, plaster of Paris, and combinations thereof.

8. The composition mixture of claim 7 wherein the composition mixture includes from about 10 to about 30% of reinforcing filler material, based on the total weight of the composition mixture.

9. The composition mixture of claim 8 wherein the reinforcing filler material comprises glass fibers.

10. The highly extended, unsaturated polyester resin syrup composition mixture of claim 6 comprising:
    (a) from about 15 to about 25%, by weight, of unsaturated polyester resin syrup;
    (b) from about 20 to about 30%, by dry weight, of basic aluminum clhoride; and
    (c) from about 60 to about 70%, by weight, of non-reinforcing extender material.

11. The composition mixture of claim 10 wherein the extender material includes one member selected from the group consisting of aluminum trihydrate, plaster of Paris, and combinations thereof.

12. The composition of claim 11 wherein the composition mixtuer includes from about 10 to about 30% of glass fibers, based on the total weight of the composition mixture.

13. A shaped article comprised of a cured, cross-linked, highly extended, unsaturated polyester resin syrup composition comprising:
    (a) unsaturated polyester resin syrup composed of an unsaturated polyester resin reacted with an ethylenically unsaturated copolymerizable monomer;
    (b) basic aluminum chloride having the formula $$Al_2(OH)_xCl_{6-x}$$

wherein x is 3, 4 or 5; and
    (c) non-reinforcing extender material, wherein the dry weight ratio of the sum of extender material and the basic aluminum chloride to the resin syrup is from about 2.0:1.0 to about 8.5:1.0 and wherein the dry weight ratio of the extender material to the basic aluminum chloride is less than about 7.5:1.0.

14. The shaped article of claim 13 wherein the extender material includes one member selected from the group consisting of aluminum trihydrate, plaster of Paris, and combinations thereof.

15. The shaped article of claim 14 wherein the composition includes from about 10 to about 30% of glass fibers, based on the total weight of the composition.

16. A shaped article comprised of a cured, crosslinked, highly extended, unsaturated polyester resin syrup composition comprising:
(a) from about 15 to about 25%, by weight, of unsaturated polyester resin syrup composed of an unsaturated polyester resin reacted with an ethylenically unsaturated copolymerizable monomer;
(b) from about 20 to about 30%, by dry weight, of basic aluminum chloride having the formula $$Al_2(OH)_xCl_{6-x}$$

wherein x is 3, 4 or 5; and
(c) from about 60 to about 70%, by weight, of non-reinforcing extender material.

17. The shaped article of claim 16 wherein the extender material includes one member selected from the group consisting of aluminum trihydrate, plaster of Paris, and combinations thereof.

18. The shaped article of claim 17 wherein the composition includes from about 10 to about 30% of glass fibers, based on the total weight of the composition.

19. A process for preparing a shaped article comprising:
(a) preparing a first component comprising
(i) unsaturated polyester resin syrup composed of an unsaturated polyester resin and an ethylenically unsaturated copolymerizable monomer, and
(ii) non-reinforcing extender material;
(b) preparing a second component comprising
(i) an aqueous solution containing from about 40 to about 65%, by weight, of basic aluminum chloride having the formula $$Al_2(OH)_xCl_{6-x}$$

wherein x is 3, 4 or 5; and
(ii) non-reinforcing extender material;
(c) mixing the first and second components to form a composition mixture;
(d) shaping the composition mixture into the configuration of the article; and
(e) curing the composition mixture,
wherein the dry weight ratio of the sum of the extender material and the basic aluminum chloride to the resin syrup is from about 2.0:1.0 to about 8.5:1.0 and the dry weight ratio of the extender material to the basic aluminum chloride is less than about 7.5:1.0.

20. The process of claim 19 wherein the extender material of the first and second components is selected from the group consisting of aluminum trihydrate, plaster of Paris, and combinations thereof.

21. The process of claim 20 wherein the extender material of the first component comprises one member selected from the group of consisting of aluminum trihydrate, plaster of Paris, and combinations thereof and wherein the extender material of the second component comprises aluminum trihydrate.

22. The process of claim 20 wherein the extender material includes plaster of Paris and the plaster of Paris is allowed to harden before the resin syrup is cured thereby obtaining a rigid article.

23. The process of claim 20 wherein the extender material includes plaster of Paris and the resin syrup is allowed to cure before the plaster of Paris hardens thereby obtaining a flexible article.

24. The process of claim 20 wherein the composition mixture includes from about 10 to about 30% of reinforcing filler material, based on the total weight of the mixture.

25. The process fo claim 24 wherein the reinforcing filler material comprises glass fibers.

26. The process of claim 20 wherein a surfactant is added to the second component.

27. The process of claim 19 wherein the total weight of extender material is divided between the first component and the second component such that viscosity of the first and second components are approximately equal.

28. The process of claim 19 wherein the dry weight ratio of the sum of the extender material and the basic aluminum chloride to the resin syrup is from about 2.5:1.0 to about 6.5:1.0 and wherein the dry weight ratio of extender material to basic aluminum chloride is from about 4.0:1.0 to about 7.0:1.0.

29. The process of claim 19 wherein the first and second components are subjected to a vacuum before being mixed together whereby the viscosity of the first component, the second component and the composition mixture is reduced.

30. The process of claim 20 wherein the particle size distribution of the extender material is selected to reduce the viscosity of the composition mixture.

* * * * *